(12) United States Patent
Jha

(10) Patent No.: US 9,571,436 B1
(45) Date of Patent: Feb. 14, 2017

(54) PREVENTING MODIFICATION OF AN EMAIL

(71) Applicant: International Business Machines Corporation, Armonk, NY (US)

(72) Inventor: Bimal K. Jha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/964,675

(22) Filed: Dec. 10, 2015

(51) Int. Cl.
*G06F 15/16* (2006.01)
*H04L 12/58* (2006.01)

(52) U.S. Cl.
CPC ............. *H04L 51/12* (2013.01); *H04L 51/063* (2013.01)

(58) Field of Classification Search
CPC .............................. H04L 51/12; H04L 51/063
See application file for complete search history.

(56) References Cited

U.S. PATENT DOCUMENTS

| | | | |
|---|---|---|---|
| 7,222,156 B2 | 5/2007 | Gupta et al. | |
| 7,792,911 B2 | 9/2010 | Wilson | |
| 8,984,411 B2 | 3/2015 | Van Belle et al. | |
| 2007/0016647 A1 | 1/2007 | Gupta et al. | |
| 2008/0034315 A1* | 2/2008 | Langoulant | G06Q 10/107 715/780 |
| 2008/0086530 A1 | 4/2008 | Gandhi et al. | |
| 2009/0214034 A1 | 8/2009 | Mehrotra et al. | |
| 2009/0265308 A1 | 10/2009 | Brown | |
| 2010/0050101 A1 | 2/2010 | Baik et al. | |
| 2010/0125891 A1 | 5/2010 | Baskaran | |
| 2010/0186062 A1 | 7/2010 | Banti et al. | |
| 2012/0265607 A1 | 10/2012 | Belwadi | |
| 2015/0150091 A1 | 5/2015 | Bruce et al. | |
| 2015/0186356 A1 | 7/2015 | Van Belle et al. | |

FOREIGN PATENT DOCUMENTS

CN  104219137 A  12/2014

OTHER PUBLICATIONS

List of IBM Patents or Patent Applications Treated as Related, Filed Jul. 5, 2016.
U.S. Appl. No. 15/201,897, filed Jul. 5, 2016, Entitled "Preventing Modification of an Email", 14 pages.
List of IBM Patents or Patent Applications Treated as Related, Filed Feb. 26, 2016, 2 pages.
U.S. Appl. No. 15/054,177, filed Feb. 26, 16, Entitled "Preventing Modification of an Email", 17 pages.

* cited by examiner

*Primary Examiner* — Moustafa M Meky
(74) *Attorney, Agent, or Firm* — Edward J. Wixted, III

(57) ABSTRACT

In an approach for preventing the modification of an email by the recipients of the email, a processor receives an indication that an email message is composed. A processor receives an indication that modification of contents of the email message, by one or more recipients of the email message, is to be prevented. A processor converts the contents of the email message from editable text to a non-editable format. A processor sends the converted email message to a recipient.

20 Claims, 3 Drawing Sheets

PREVENTING MODIFICATION OF AN EMAIL

BACKGROUND

The present invention relates generally to the field of email, and more particularly to preventing the modification of an email by the recipients of the email.

An email, or electronic mail, is a method of exchanging digital messages from an author to one or more recipients. Email operates across the Internet or other networks. An Internet email message includes three components: the message envelope, the message header, and the message body. The message header contains control information, including, minimally, an originator's email address and one or more recipient addresses. Usually, descriptive information is also added, such as a subject header field and a message submission date/time stamp.

SUMMARY

Aspects of an embodiment of the present invention disclose a method, computer program product, and computing system for preventing the modification of an email by the recipients of the email. A processor receives an indication that an email message is composed. A processor receives an indication that modification of contents of the email message, by one or more recipients of the email message, is to be prevented. A processor converts the contents of the email message from editable text to a non-editable format. A processor sends the converted email message to a recipient.

BRIEF DESCRIPTION OF THE DRAWINGS

FIG. 3 depicts an example of an email interface, in accordance with an embodiment of the present invention.

DETAILED DESCRIPTION

With the current state of email, the recipient of an email can edit the content of the received email when replying or forwarding the email. Embodiments of the present invention recognize that an email that cannot be modified when used as a reference in replying or forwarding may be viewed as more authentic to the person receiving the reply or forward email. Embodiments of the present invention detail an approach that can be used to prevent the modification of an email by the recipients of the email.

Embodiments of the present invention will now be described in detail with reference to the Figures.

Figure 1:
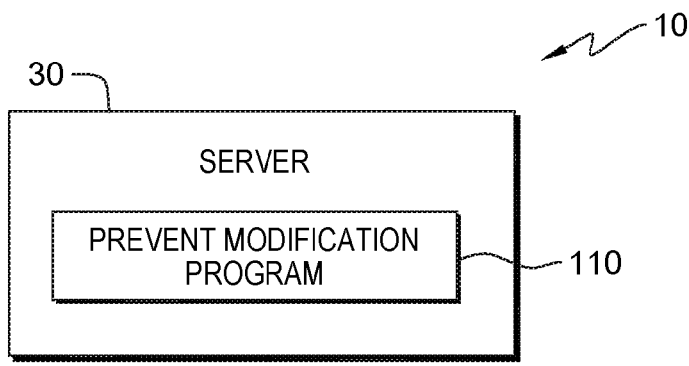
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30. In some embodiments, computing system 10 can send and receive information over a network. The network (not shown) may be a local area network (LAN), a wide area network (WAN) such as the Internet, a cellular data network, any combination thereof, or any combination of connections and protocols that will support communications between server 30 and other computing devices (not shown) that may send information to server 30 and/or receive information from server 30, in accordance with embodiments of the invention. The network may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains prevent modification program 110. Server 30 may include components, as depicted and described in further detail with respect to FIG. 4.

Prevent modification program 110 prevents the modification of an email by the recipients of the email. In doing so, a user, initially, composes a message. Prevent modification program 110 receives an indication that the message is complete. Prevent modification program 110 receives an indication that the user wants to prevent modification of the message. Prevent modification program 110 converts the message from a text file to a picture file. While a picture file is merely one example, prevent modification program 110 may convert the message from a text file to any type of non-editable file (e.g., a non-editable portable document format (PDF) file). Prevent modification program 110 sends the picture file to a recipient. In the depicted embodiment, prevent modification program 110 resides on server 30. In other embodiments, prevent modification program 110 may reside on another server or another computing device.

Figure 2:
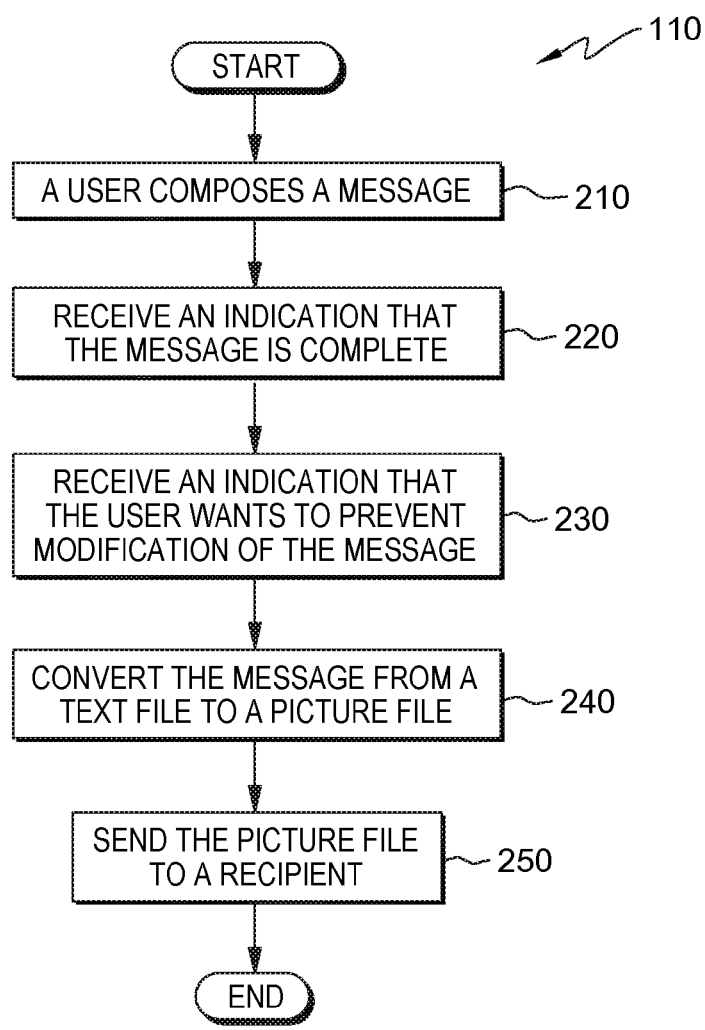
FIG. 2 depicts a flowchart of the steps of a prevent modification program, executing within the computing system of FIG. 1, for preventing the modification of an email by the recipients of the email, in accordance with an embodiment of the present invention.

FIG. 2 depicts a flowchart of the steps of a prevent modification program, executing within the computing system of FIG. 1, in accordance with an embodiment of the present invention. Prevent modification program 110 prevents the modification of an email by the recipients of the email.

In step 210, a user, initially, composes a message. In one embodiment, the user composes a message by typing a new message within the message body section of an email. In other embodiments, the user composes a message by copying and pasting text into the message body from another source. The message is in the form of text.

In step 220, prevent modification program 110 receives an indication that the message is complete. In one embodiment, prevent modification program 110 receives an indication that the message is complete after a predetermined time period after the user ceases typing in the body of the email. In other embodiments, prevent modification program 110 receives an indication that the message is complete after the user clicks an arbitrary "message complete" button within an email interface. In some embodiments, prevent modification program 110 receives an indication that the message is complete after the user clicks the delivery options button within an email interface, such as Delivery Options 310 within environment 300 in FIG. 3 below. Still, in other embodiments, prevent modification program 110 receives an indication that the message is complete after the user clicks the "Send" button within an email interface, where a default delivery option could be that every email sent would be un-editable.

In step 230, prevent modification program 110 receives an indication that the user wants to prevent modification of the message. In one embodiment, prevent modification program 110 receives an indication that the user wants to prevent modification of the message after the user clicks the prevent modification button within an email interface, such as Prevent Modification 340 within environment 300 in FIG. 3 below. In other embodiments, prevent modification program 110 receives an indication that the user wants to prevent modification of the message after the user types "Prevent Modification" in the heading or body of the email. In some embodiments, prevent modification program 110 receives an automatic indication that the user wants to prevent modification of the message after prevent modification program 110 receives the indication that the message is complete.

In step 240, prevent modification program 110 converts the message from a text file to a picture file. While a picture file is merely one example, prevent modification program 110 may convert the message from a text file to any type of non-editable file (e.g., a non-editable PDF file). In one embodiment, prevent modification program 110 converts the message from a text file to a picture file by taking a screenshot of the message body. In other embodiments, prevent modification program 110 converts the message from a text file to a picture file by using a program (not shown) that is developed to convert files from one version to another version. In some embodiments, the message will appear the same as a normal message in the message body when received by a recipient. In some embodiments, prevent modification program 110, via an email client, makes the text un-editable. For example, if the email is sent to people within the same company (i.e., using company email addresses and a company-wide email client), prevent modification program 110, via the email client, can cause the text to be un-editable to recipients of the email.

In step 250, prevent modification program 110 sends the picture file to a recipient. In one embodiment, prevent modification program 110 sends the picture file to the recipient by copying the picture file into the body of the email. In some embodiments, prevent modification program 110 sends the picture file to the recipient by including the picture file as an attachment. In one embodiment, prevent modification program 110 sends the picture file to the recipient after the user clicks the "Send" button within an email interface. In other embodiments, prevent modification program 110 automatically sends the picture file to the recipient after prevent modification program 110 converts the message from a text file to a picture file.

Figure 3:
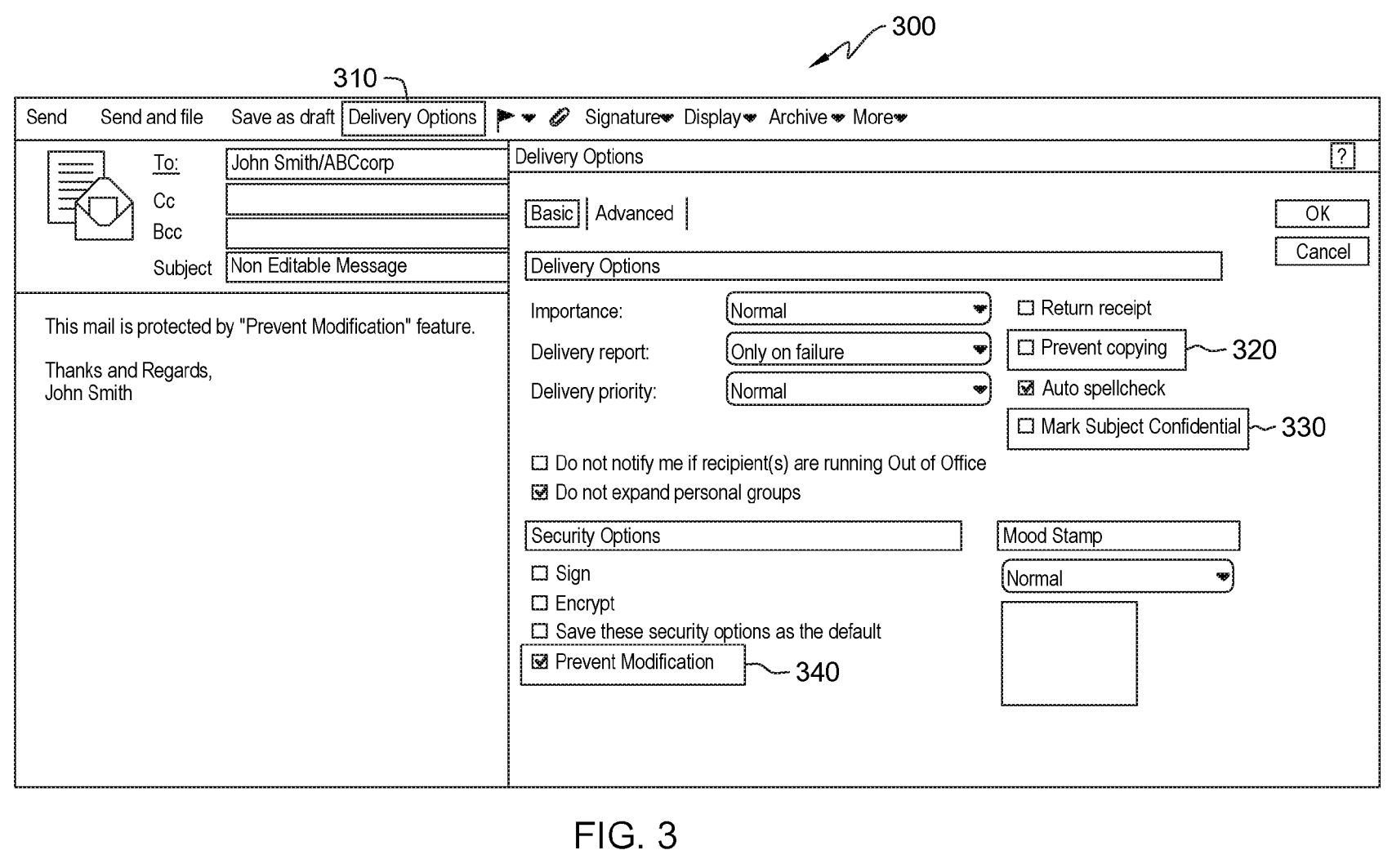

In FIG. 3, environment 300 depicts an example of an email interface, in accordance with an embodiment of the present invention.

Environment 300 depicts an email interface that includes Delivery Options 310, Prevent Copying 320, Mark Subject Confidential 330, and Prevent Modification 340. In the depicted embodiment, Delivery Options 310 opens up a window, or otherwise gives the user options and parameters, to choose for delivering an email, such as Prevent Copying 320, Mark Subject Confidential 330, and Prevent Modification 340. In the depicted embodiment, Prevent Copying 320 gives the user the option to prevent the receiver from replying or forwarding the sent email. In the depicted embodiment, Mark Subject Confidential 330 gives the user the option to label the email as confidential. In the depicted embodiment, Prevent Modification 340, after implementation of embodiments of the present invention, gives the user the option to allow the receiver to reply or forward the sent email, but prevents the user from modifying the contents of the sent email.

As an example, in step 230 of FIG. 2, prevent modification program 110 may receive an indication that the user wants to prevent modification of the message by the user clicking Prevent Modification 340. Prevent Modification 340 is revealed after the user clicks Delivery Options 310. Additionally, Prevent Copying 320 and Mark Subject Confidential 330 are also revealed after the user clicks Delivery Options 310.

Figure 4:
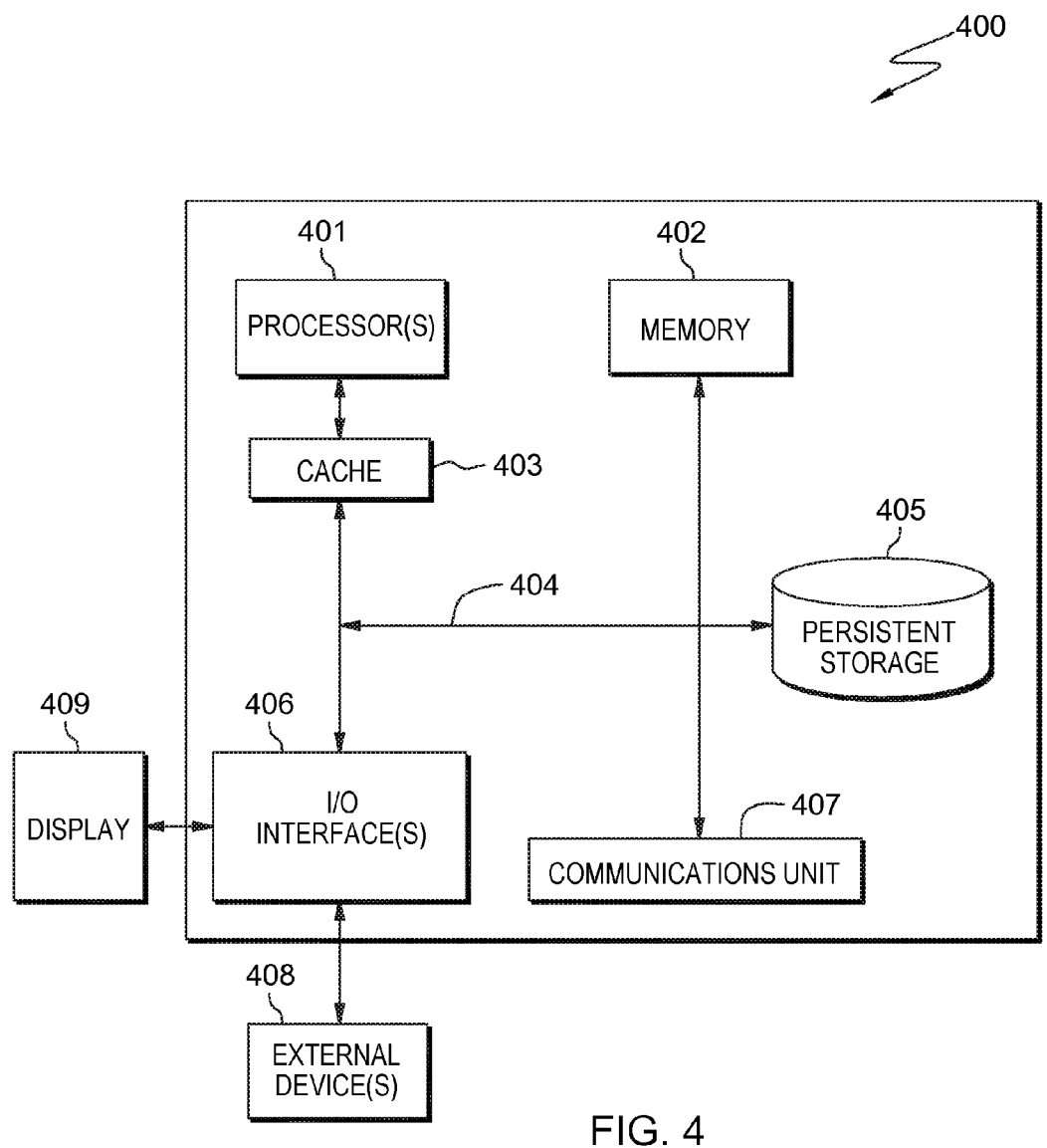
FIG. 4 depicts a block diagram of components of the server of FIG. 1, in accordance with an embodiment of the present invention.

FIG. 4 depicts computer system 400, which is an example of a system that includes components of server 30. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

Prevent modification program 110 may be downloaded to persistent storage 405 of server 30 through communications unit 407 of server 30.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., prevent modification program 110, can be stored on such portable computer readable storage media and can be loaded onto persistent storage 405 of server 30 via I/O interface(s) 406 of server 30. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for preventing the modification of an email by the recipients of the email, the method comprising:
    receiving, by one or more processors, an indication that an email message is composed;
    receiving, by one or more processors, an indication that modification of contents of the email message, by one or more recipients of the email message, is to be prevented;
    converting, by one or more processors, the contents of the email message from editable text to a non-editable format; and
    sending, by one or more processors, the converted email message to a recipient.

2. The method of claim 1, wherein receiving the indication that modification of the contents of the email message is to be prevented comprises:
    receiving, by one or more processors, the indication based on a selection of a prevent modification button within an interface.

3. The method of claim 1, wherein receiving the indication that modification of the contents of the email message comprises:
    receiving, by one or more processors, an automatic indication that the user wants to prevent modification of the email message after the email message is complete.

4. The method of claim 1, wherein converting the contents of the email message from editable text to the non-editable format comprises:
    capturing, by one or more processors, a screenshot of the contents of the email message.

5. The method of claim 1, wherein converting the contents of the email message from editable text to the non-editable format comprises:
    using, by one or more processors, a file converter to convert the contents of the email message from editable text to the non-editable format.

6. The method of claim 1, wherein sending the converted email message to the recipient comprises:
    sending, by one or more processors, the converted email message to the recipient automatically after the editable text is converted to the non-editable format.

7. The method of claim 1, wherein the non-editable format is a picture file.

8. A computer program product for preventing the modification of an email by the recipients of the email, the computer program product comprising:
    one or more computer readable storage media and program instructions stored on the one or more computer readable storage media, the program instructions comprising:
    program instructions to receive an indication that an email message is composed;
    program instructions to receive an indication that modification of contents of the email message, by one or more recipients of the email message, is to be prevented;
    program instructions to convert the contents of the email message from editable text to a non-editable format; and
    program instructions to send the converted email message to a recipient.

9. The computer program product of claim 8, wherein program instructions to receive the indication that modification of the contents of the email message is to be prevented comprise:
    program instructions to receive the indication based on a selection of a prevent modification button within an interface.

10. The computer program product of claim 8, wherein program instructions to receive the indication that modification of the contents of the email message comprise:
    program instructions to receive an automatic indication that the user wants to prevent modification of the email message after the email message is complete.

11. The computer program product of claim 8, wherein program instructions to convert the contents of the email message from editable text to the non-editable format comprise:
    program instructions to capture a screenshot of the contents of the email message.

12. The computer program product of claim 8, wherein program instructions to convert the contents of the email message from editable text to the non-editable format comprise:
    program instructions to use a file converter to convert the contents of the email message from editable text to the non-editable format.

13. The computer program product of claim 8, wherein program instructions to send the converted email message to the recipient comprise:
    program instructions to send the converted email message to the recipient automatically after the editable text is converted to the non-editable format.

14. The computer program product of claim 8, wherein the non-editable format is a picture file.

15. A computer system for preventing the modification of an email by the recipients of the email, the computer system comprising:
    one or more computer processors, one or more computer readable storage media, and program instructions stored on the computer readable storage media for execution by at least one of the one or more processors, the program instructions comprising:

program instructions to receive an indication that an email message is composed;

program instructions to receive an indication that modification of contents of the email message, by one or more recipients of the email message, is to be prevented;

program instructions to convert the contents of the email message from editable text to a non-editable format; and program instructions to send the converted email message to a recipient.

16. The computer system of claim 15, wherein program instructions to receive the indication that modification of the contents of the email message is to be prevented comprise:

program instructions to receive the indication based on a selection of a prevent modification button within an interface.

17. The computer system of claim 15, wherein program instructions to receive the indication that modification of the contents of the email message comprise:

program instructions to receive an automatic indication that the user wants to prevent modification of the email message after the email message is complete.

18. The computer system of claim 15, wherein program instructions to convert the contents of the email message from editable text to the non-editable format comprise:

program instructions to capture a screenshot of the contents of the email message.

19. The computer system of claim 15, wherein program instructions to convert the contents of the email message from editable text to the non-editable format comprise:

program instructions to use a file converter to convert the contents of the email message from editable text to the non-editable format.

20. The computer system of claim 15, wherein program instructions to send the converted email message to the recipient comprise:

program instructions to send the converted email message to the recipient automatically after the editable text is converted to the non-editable format.

\* \* \* \* \*